United States Patent [19]

Ayral et al.

[11] Patent Number: 5,045,719

[45] Date of Patent: Sep. 3, 1991

[54] DEFLECTION CELL FOR POWER LASER BEAMS

[75] Inventors: Jean-Luc Ayral; Jean P. Huignard, both of Paris, France

[73] Assignee: Thomson-CSF, Puteaux, France

[21] Appl. No.: 493,245

[22] Filed: Mar. 14, 1990

[30] Foreign Application Priority Data

Mar. 31, 1989 [FR] France ............................... 89 04259

[51] Int. Cl.[5] ............................................. H01S 3/108

[52] U.S. Cl. ........................................ 359/327; 372/3; 372/21; 372/99; 372/108

[58] Field of Search ................. 372/3, 24, 21, 99, 108, 372/13; 307/425, 426

[56] References Cited

U.S. PATENT DOCUMENTS

| | | | |
|---|---|---|---|
| 3,515,897 | 7/1970 | Culver | 307/426 |
| 3,624,421 | 11/1971 | Pontell et al. | 372/3 |
| 4,280,109 | 7/1981 | Stappaerts | 372/3 |
| 4,599,725 | 7/1986 | George | 372/3 |
| 4,829,528 | 5/1989 | Band et al. | 372/3 |

FOREIGN PATENT DOCUMENTS

| | | |
|---|---|---|
| 0067082 | 5/1982 | European Pat. Off. . |
| 0292353 | 5/1988 | European Pat. Off. . |

*Primary Examiner*—Frank Gonzalez
*Assistant Examiner*—Galen J. Hanson
*Attorney, Agent, or Firm*—Oblon, Spivak, McClelland, Maier & Neustadt

[57] ABSTRACT

This invention relates to deflection cells for laser beams. A deflection cell according to the present invention essentially comprises a deflector such as of the "acoustooptical" type, to deflect a low-power incident laser beam, and a system to make that deflected low-power incident beam, in a nonlinear Brillouin diffusion medium 11 like a gas such as methane ($CH_4$), xenon, sulfur hexafluoride ($SF_6$), or a liquid such as carbon disulfide ($CS_2$), acetone, work with a high-power laser pump beam, forming a nonzero angle "$\theta$" with the deflected beam. Application, in particular, to telemetry and missile guidance for which the laser beam used as reference should be able to undergo orientation changes which are quick and in a large angular field.

8 Claims, 1 Drawing Sheet

DEFLECTION CELL FOR POWER LASER BEAMS

BACKGROUND OF THE INVENTION

1. Field of The Invention

This invention relates to deflection cells for laser beams, essentially for power laser beams, i.e. the controllable means which make it possible to deflect these beams at a given angle.

2. Discussion of The Background

In many fields, for example, telemetry and missile guidance, a laser beam, whose space-time coherence makes it possible to define a "small and immaterial line" over a relatively long path, is used as a reference element.

Actually, for example, for terrestrial missile guidance over distances on the order of several hundreds of meters, a "helium-neon" type laser generator of several milliwatts of power, for example, is used. The beam defined by this type of generator is fine enough to be used as a reference for guiding or telemetering, and the generator itself is small enough to make it possible to solve the problem posed by the obligation to perform orientation changes of the beam emitted, at times for large angle values. For this purpose, it is sufficient, for example, to mount the laser generator on a plate which can be moved by motors along two or three axes. This use gives the desired result, of course, but provided that the necessary angular displacement velocity is not very great.

In particular for terrestrial missile guidance having to move quickly, deflection cells have been made which are placed on the laser beam itself, at the output of the laser generator, and which are controlled, electrically, for example, as the acoustooptical static deflectors well known to one skilled in the art. The advantage of these types of deflectors is that they very quickly respond to the deflection orders which are given to them. They exhibit, on the other hand, a major drawback, namely, that of being able to only deflect low-power laser beams. Actually, in the case of the deflection of power beams, the deflectors are deteriorated very quickly by the laser beam itself, and, moreover, their effectiveness decreases when the deflection angle increases. In particular, the power of the deflected beam diminishes.

SUMMARY OF THE INVENTION

This invention has as its object to make a deflection cell for high-power laser beams, which makes it possible to obtain deflections of these beams along a great angular deflection, and to keep their optical qualities, i.e. the power, the coherence and the divergence, that they have at the output of the laser generator.

More precisely, this invention has as its object a deflection cell for a laser beam, characterized by the fact that it comprises:

means to deflect a low-power incident laser beam, and means to make the deflected low-power incident beam work with a high-power laser pump beam, forming a nonzero angle with the deflected beam, in a nonlinear Brillouin diffusion medium.

BRIEF DESCRIPTION OF THE DRAWINGS

Other characteristics and advantages of this invention will come out during the following description given with regard to the accompanying drawings by way of illustrative, but not at all limiting, example, in which.

DESCRIPTION OF THE PREFERRED EMBODIMENTS

Figure 1:
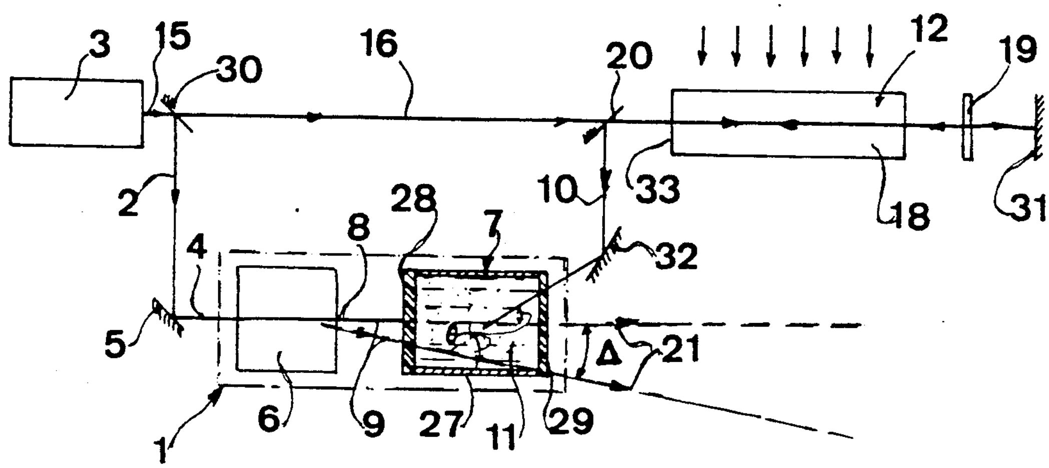
FIGS. 1 and 2 show an embodiment of a deflecting cell according to the invention, respectively in two examples of application to the deflection of a high-power laser beam.

In returning more particularly to FIG. 1, the latter shows a cell 1 according to the present invention, able to receive a low-power incident laser beam 2 emitted by a laser generator 3 called "pilot." Incident beam 2 is directed to input window 4 of the cell by, for example, "total reflection" type return mirror 5.

The cell comprises means 6 to deflect the incident laser beam, with the control and in a given angle "$\Delta$". These deflecting means can consist of a deflector of the "acoustooptical" type known in the art and very diagrammatically consisting of a crystal with a base of lithium niobate ($LiNbO_3$) or tellurium oxide ($TeO_2$) to which conducting electrodes fed by high-voltage electric generators are applied. This type of deflector known in the art will not be further described here.

The deflection cell further comprises means 7 to make deflected beam 9, at output 8 of deflector 6, work with a high-power pump beam 10 forming a nonzero angle "$\theta$" with deflected beam 9, this interaction being performed in a nonlinear medium 11 making possible the generation, for example, of a stimulated Brillouin diffusion. This nonlinear medium 11 can consist of a gas such as methane ($CH_4$), xenon, sulfur hexafluoride ($SF_6$), or a liquid such as carbon disulfide ($CS_2$), acetone, etc. contained in a fluid tight jacket 27 comprising, on the possible optical paths of deflected beam 9 and pump beam 10, two windows 28, 29, optically transparent to the wavelengths of the two beams. When the two laser beam are in the domain of the visible light, these optical windows are, for example, glass.

In the example of application illustrated in FIG. 1, pump beam 10 is provided by a laser amplifier 12 called "double passage," and for which the laser beam to be amplified is that emitted by pilot laser generator 3.

In this configuration, pilot laser 3 is coupled to the input of amplifier 12 by a plate 30, semi-reflecting in this case, making it possible to deflect a first part 2 of beam 15 emitted by pilot laser 3 and to let a second part 16 of the beam pass which is sent to the input window of amplifier 12 comprising in particular a laser amplifying medium 18. This medium makes it possible, in a known way, to increase the energy of incident beam 16 by stimulated amplification. The beam, having gone through medium 18 a first time, goes through a quarter-wave plate 19 which causes a rotation of the polarization of the beam. At the output of this quarter-wave plate, the beam is reflected on a mirror 31, which is standard or has pseudo phase conjugation, to be returned to laser amplifying medium 18 after having again gone through quarter-wave plate 19.

The beam obtained at output 33 of amplifying medium 18 is deflected by a polarization separator 20 which gives rise to pump beam 10 defined previously.

This beam is directed, in particular by total reflection mirror 32, to output window 29 of jacket 11 to be able to work with beam 9 obtained at output 8 of controllable deflector 6.

This configuration makes it possible to transfer the energy of pump beam 10 to pilot beam 2, provided, however, that these beams and the interaction geometry meet the energy density conditions making it possible to exceed the threshold of the Brillouin effect. Thus, an amplification of the pilot beam of several tens of dB can be obtained if the frequencies of the two beams are staggered relative to one another by an amount intrinsic to the interaction medium, on the order of several hundreds of MHz for a gas medium and of several GHz for a liquid medium. Now, this staggering between the frequencies of the two beams is achieved by the Doppler staggering induced on the beam at the output of the acoustooptical modulator, which constitutes one of the advantages of this invention.

Another essential advantages of the deflection device described above resides in the fact that beam 21 obtained at the output of cell 1 exhibits a great power whatever may be the value of the deflection angle which has been imposed on it, while keeping the intrinsic qualities of pilot incident beam 2, since the power of pump beam 10 is transmitted to the pilot beam.

Figure 2:
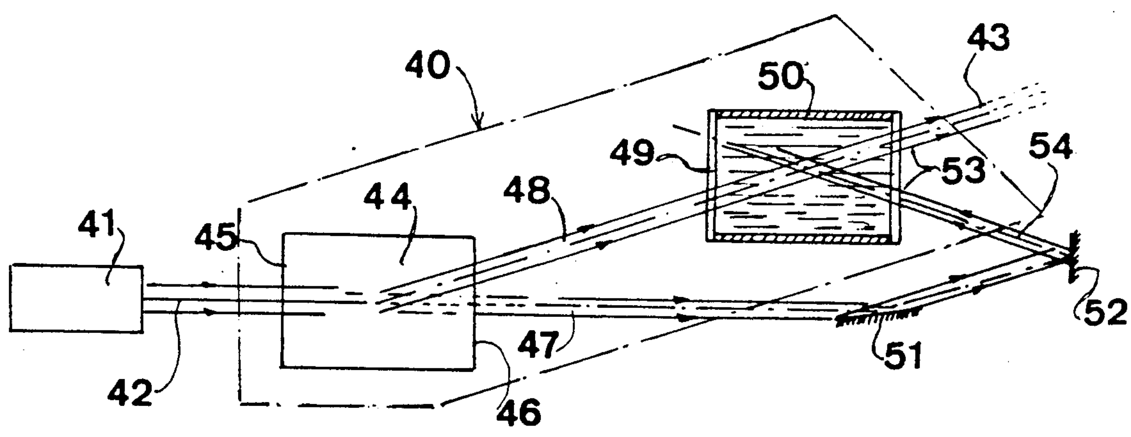

FIG. 2 shows another application of a deflection cell 40 according to the present invention, in which a single laser generator 41 is used for delivering at the output a high-power beam 42, but nevertheless providing a deflected beam 43 having all the qualities mentioned above.

In this application mode, deflector of acoustoopical type 44 receives, at its input 45, high-power beam 42 emitted by generator 41 and deflects a part 48 of it. Of course, the power of incident beam 42 will be determined so that the essential constituent element of the acoustooptical deflector is not deteriorated.

At its output 46, this deflector 44 provides two beams, a high power transmitted undeflected beam 47 and a low-power deflected beam 48 which is directed to input 49 of a jacket 50 such as described above with regard to FIG. 1, referenced 11. Undeflected high-power beam 47 is taken by return mirrors such as conjugation mirrors 51, 52 so that it can penetrate output window 53 of the jacket and form pump beam 54 as defined above under reference 10 in FIG. 1.

Cell 40 exhibits the same advantages as those which have been mentioned for cell 1 described in regard to FIG. 1, and which will not be recalled here. It further exhibits, relative to the preceding device, a significant additional advantage: that of limiting the number of means for the making of incident beams and pump beams with a single laser generator.

We claim:

1. A deflection cell for a laser beam comprising:

a first generating means for generating an incident laser beam;

a deflection means for adjustably deflecting said incident laser beam towards a predetermined target;

a second generating means for generating a high-power laser pump beam;

a nonlinear Brillouin diffusion medium for receiving said incident laser beam and laser pump beam to transmit power from said laser pump beam to said incident laser beam to thereby amplify said incident laser beam, wherein said laser pump beam forms a nonzero angle with said deflected incident laser beam.

2. A deflection cell according to claim 1, wherein said to deflection means comprises a deflector to the acoustoopical type.

3. A deflection cell according to claim 2, wherein said deflector comprises a crystal with a base of lithium niobate ($LiNbO_3$) or tellurium oxide ($TeO_2$).

4. A deflection cell according to any of the claim 1, wherein said nonlinear Brillouin diffusion medium comprises a gas such as methane ($CH_4$), xenon, sulfur hexafluoride ($SF_6$), or a liquid such as carbon disulfide ($CS_2$), or a liquid such as carbon disulfide ($CS_2$), of acetone.

5. A deflection cell according to claim 4, wherein said nonlinear Brillouin diffusion medium comprises a fluid tight jacket and further comprising, on optical paths of the deflected incident laser and the laser pump beam two windows optically transparent at wavelengths of the incident laser and laser pump beams.

6. A deflection cell according to any one of claims 1–3, wherein said laser pump beam is generated by a double passage laser amplifier and wherein the incident laser beam to be amplified is emitted by a pilot laser generator.

7. A deflection cell according to claim 6, wherein said pilot laser is coupled to the input of the double passage amplifier by a semi-reflecting plate, said double passage laser amplifier comprising, on an optical axis, at least one laser amplifying medium, a quarter-wave plate and a reflecting mirror, wherein said double passage laser amplifier further comprising a polarization separator placed between the semi-reflecting plate and the laser amplifying medium.

8. A deflection cell according any one of claims 2 to 3, wherein said laser pump beam and incident laser beam are delivered by a single laser generator delivering at an output a high power laser beam directed to said acoustoopical type deflector, said deflector deflecting a part of said high power output beam to generate the incident laser beam, said high power output beam being transmitted undeflected to generate said laser pump beam.

* * * * *